Figure 4:
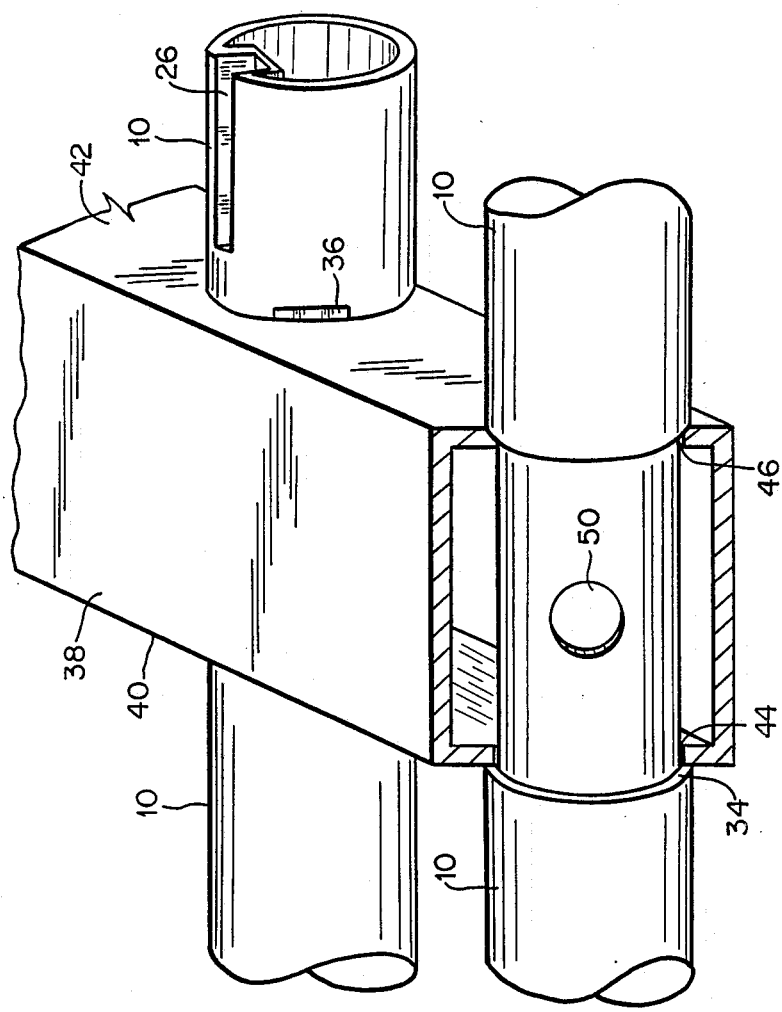

United States Patent [19]

Ott

[11] Patent Number: 4,954,296

[45] Date of Patent: Sep. 4, 1990

[54] GAS INJECTION EQUIPMENT

[75] Inventor: Wilfried Ott, Langenhagen, Fed. Rep. of Germany

[73] Assignee: Rita Ott, Langenhagen, Fed. Rep. of Germany

[21] Appl. No.: 361,135

[22] Filed: Jun. 5, 1989

[30] Foreign Application Priority Data

Jun. 3, 1988 [DE] Fed. Rep. of Germany ....... 3819305

[51] Int. Cl.$^5$ ............................................. B01F 3/04
[52] U.S. Cl. ................................................... 261/122
[58] Field of Search .......................................... 261/122

[56] References Cited

U.S. PATENT DOCUMENTS

| 3,953,553 | 4/1976 | Thayer | 261/122 |
| 4,118,447 | 10/1978 | Richter | 261/122 |
| 4,734,191 | 3/1988 | Schussler | 261/122 |
| 4,818,446 | 4/1989 | Schreiber et al. | 261/122 |

FOREIGN PATENT DOCUMENTS

| 3418548 | 11/1985 | Fed. Rep. of Germany | 261/122 |
| 3319161 | 4/1987 | Fed. Rep. of Germany | 261/122 |

Primary Examiner—Tim Miles
Attorney, Agent, or Firm—Collard, Rod & Galgano

[57] ABSTRACT

With gas injection equipment used to inject a gas into a liquid the problem exists that the conducting element filled with gas will experience buoyancy. To eliminate this buoyancy, the conducting element is open at its free end and closed at its other end, bearing there a fastening connection permitting its connection to a gas supply distributor. The conducting element is surrounded by a perforated, hose-like membrane, and a gas supply conduit discharges into the area of the membrane. To facilitate fabrication and assembly as well as in order to reduce material consumption, the conducting element is configured in such a way that its gas supply conduit penetrates the fastening connection as an axial blindend bore, and that in the area of the membrane at least one radial discharge is present. A transverse groove preferably extends from the discharge of the gas supply conduit up to the free end of the conducting element, over which transverse groove gas can be uniformly distributed.

8 Claims, 2 Drawing Sheets

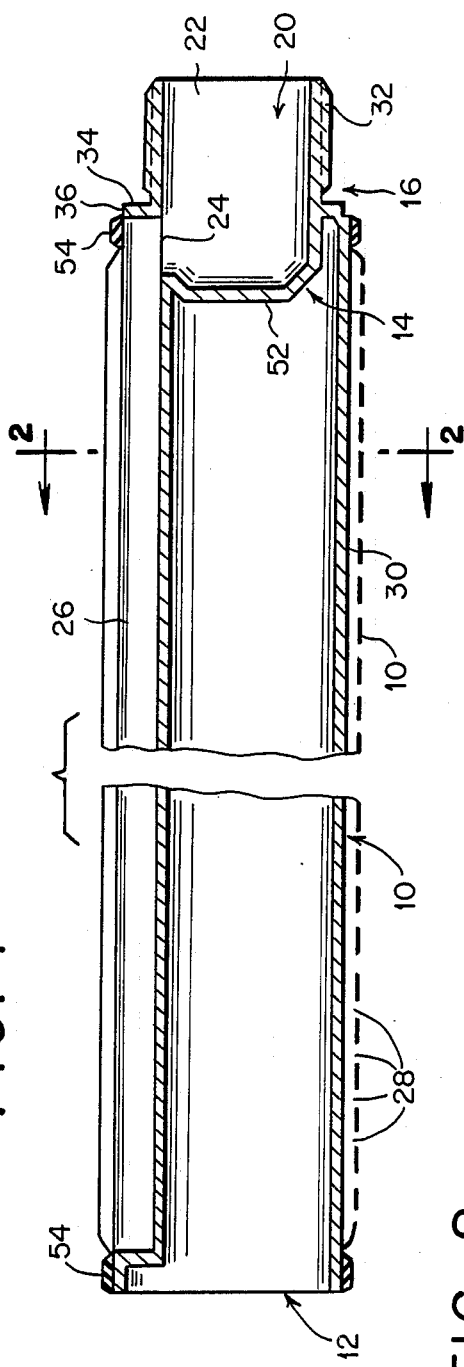
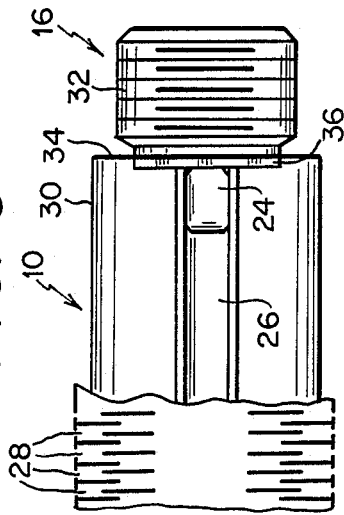
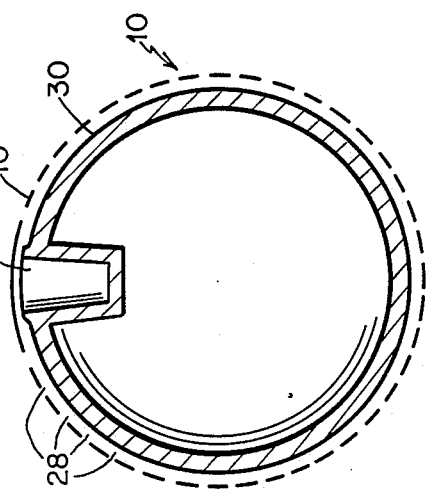

GAS INJECTION EQUIPMENT

The present invention relates to gas injection equipment for introducing a gas into a liquid, especially air into sewage.

Gassing devices find expedient utilization in waste water clarification in injecting air into the waste water to enable aerobic decomposition processes of the waste materials in the waste water. Because gas is always lighter than the liquid, it must be conducted from the bottom of the tank or basin into the liquid. Said injection must cover as much of the surface as possible to preclude gas bubbles from being diffused in undissolved form in the water, emerging on the surface. Where this occurs, the required saturation of the liquid cannot be achieved.

The problem arises, in the injection of a gas, that the gassing devices filled with the gas, where the pipes used for such filling are thin-walled pipes which are completely filled with the gas to be injected, would drift upwards as a result of bouyancy. In such an instance, anchoring to the bottom would have to be effected. In order to be able to operate a gassing device however without such anchoring or weights in the basin, constructive measures have already been devised to reduce the volume of the gassing device filled by the gas.

DE-OS No. 34 18 548 discloses a gassing device having a tubular conducting element which is open at one end and closed on the other, enabling it to be flooded with the liquid to be gassed. This conducting element exhibits, at its closed end, a relatively thick wall through which a gas supply conduit passes transversely. Furthermore, a hollow space has been provided in the thick wall into which a spindle having a nut to anchor the conducting element has been let.

The relatively complicated construction of the conducting element known in the art consequently requires the separate fabrication of the tubular conducting element and the closing part which forms the thick wall. Fabrication costs of this conducting element used as a bulk article are relatively high because, in addition to fabricating individual parts and placing the bore for the gas supply conduit, both parts must be assembled and connected.

The task of the invention consists in improving a gassing device pursuant to the introductory clause of claim 1 in such a way that the design of the gas supply conduit is simplified, thereby creating conditions enabling economical and materiel-efficient fabrication.

This task is resolved by means of a gassing device pursuant to the introductory clause of claim 1 by virtue of the characteristic features set forth in the characterizing clause.

According to this design, the conducting element and the fastening connection exhibit a full-length axial configuration where, for both the conducting element and the fastening connection, a relatively thin wall thickness is sufficient. In this configuration, the extension of the fastening connection is delimited by a front wall such that the flooded space of the conducting element is separated from the gas supply conduit. The discharge of the gas supply conduit is located in the wall of the blind-end bore formed inside the fastening connection and in its extension. Since both the conducting element and the fastening connection display a very simple geometric design, straightforward fabrication, almost in the course of a single working operation, is possible, for example, by extrusion processes. Wall thickness can be provided according to the extent requisite to ensure stability without recurring to an unnecessarily thick wall, which consequently consumes more material, needed to effect transverse guidance of a gas supply conduit. In addition, a very large cross-section can be obtained with the result that, in the conducting of the gas, only minor flow losses must be overcome, and gas input consequently requires only low pumping power.

An expedient execution provides for a transverse groove which extends from the discharge of the gas supply conduit up to the free end of the conducting element. By means of this transverse groove the gas can be conveyed also up to the free end of the conducting element, thereafter flowing over into the liquid. Thus, uniform gas flow over the axial length of the conducting element results.

In a further development of this execution the perforation in the membrane is provided only on the outside of the area of the transverse groove.

This enables the gas to expand initially in an annulus formed by the excess gas pressure between the surface of the conducting element and the membrane, flowing over into the liquid covering a large area. The direct flowing over of the gas from the transverse groove into the liquid, which would then be limited to a very narrow area, is thereby avoided. Moreover, following conclusion of the conveying of the gas, the membrane makes contact with surface of the conducting element in such a way that return-flow into the gas supply conduit, like a return valve, is prevented. Thus, when gassing is repeated, the liquid does not have to be expelled from the gas supply conduit and the gas, already at the onset of the gassing operation, is able to flow out, covering a large area.

According to a practical embodiment the fastening connection exhibits a thread which, compared with the surface of the conducting element, is reduced in its diameter, where the transition from the thread to the surface is configured as a stop face.

This configuration makes it possible, without additional integrally cast thread pins, required by the state of the art, to attach the conducting element to a central gas supply distributor. In a most basic configuration the central gas supply distributor could be equipped with an internal thread into which the fastening connection is screwed. Waterproofing can be achieved both via the thread and the stop faces.

A further development provides for configuring the surface in the area between the stop face and the discharge as flat face.

These flat faces provide in the immediate vicinity of the thread a point of application for an assembly or disassembly tool by means of which higher torque can be applied to the conducting element during screw mounting or loosening than is possible with manual torsioning, especially since in this instance the membrane also impedes direct transfer of the manually exerted pressure and torque to the conducting element.

A preferred execution provides for single-piece construction of the conducting element with the fastening element.

By virtue of this measure fabrication is extremely simplified and associated costs greatly reduced, which fact, given the great need for conducting pipes for a gassing device, for example, for an aerating basin of a clarification facility, is of great cost-effective significance. Owing to said single-piece construction, seams, which could otherwise be the source of leaks or other fissures, can be dispensed with.

The conducting element, together with the fastening connection, preferably consists of a highly impact-resistant synthetic material, preferably of high-pressure polyethylene (HPPE).

This material is quite amenable to processing in injection molding operations, is chemically resistant to aggressive liquids and is mechanically stable in rugged applications, e.g., installation in aeration basins, assembly and disassembly as well as during storage.

According to a practical embodiment, the conducting element is screw coupled to a central gas supply distributor.

It is possible, by virtue of this characteristic, to expand the conducting element to several units, forming a gassing device covering large surfaces and affording ease of assembly and disassembly.

In a further development, the gas supply distributor exhibits parallel walls into which several opposed bores have been let. In said configuration, the fastening connections of two opposed conducting elements engage the bores with their threads, whereby the threads are connected via a common sleeve, whereby the stop faces are braced against the side walls of the gas supply distributor. A gas intake orifice has been provided in the wall of the sleeve.

Said further development enables rapid assembly/-disassembly of a gassing device of the kind according to the invention having several conducting pipes. In said configuration the opposing conducting elements serve, respectively, to attach and seal each other on the central gas supply distributor.

The conducting elements' side walls do not require the thickness needed to receive an internal thread; rather, they serve to brace the trheads of thread connections of the conducting elements held together by a sleeve and screw coupled to each other.

Further developments and expedient executions of the invention result from the claims, the description and from the drawing which illustrates a practical embodiment.

Shown in the drawing are, in

FIG. 1 a longitudinal section through a conducting pipe of the gassing device according to the invention, FIG. 2 a section through the profile line AB according to FIG. 1, FIG. 3 a top view onto a section of the conducting element depicted in FIG. 1, and FIG. 4 a cutaway view of a gas supply distributor with conducting elements leading away from it.

FIG. 1 shows a tubular conducting element 10 which, as part of a gassing device having several conducting elements, for example, is lowered onto the bottom of an aerating basin of a clarification facility. The conducting element 10 is open at its free end 12 and closed at its other end 14 where it bears a fastening connection 16 in which, on the inside, a gas supply conduit 20 is arranged.

The gas supply conduit 20 penetrates the fastening connection as an axial blind-end bore 22 and is separated from the internal space of the tubular conducting element 10 by a wall 52.

A discharge 24 leads from the blind-end bore 22 into a transverse groove 26 which extends up the free end 12 of the conducting element 10.

A membrane 18 is attached at its free ends by means of clamps to the surface 30 of the conducting element 10. It functions, on the other hand, to distribute the gas around the conducting element such that the passage of the gas into the liquid, covering the greatest possible surface, occurs.

The membrane 18, when the gas flow is turned off, owing to its elasticity and the external pressure of the liquid, makes contact with the surface 30 of the conducting element 10. A perforation 28 in the membrane 18 has been provided for only on the outside of the area of the transverse groove 26. During gassing the membrane is slightly raised be excess pressure, creating an annulus between it and the surface 30 of the conducting element 10. Gas spreading over the transverse groove 26 in this annulus can now distribute around the conducting element 10, uniformly flowing over through the perforation 28 into the liquid.

With the aid of the AB section depicted in FIG. 2, the annulus formed between the membrane 18 and the surface 30 of the conducting element 10 can be discerned in which annulus the gas issuing from the transverse groove 26 can spread. The figure also shows that the perforation 28 is located only outside the area of the transverse groove 26.

When the gas flow is turned off, the membrane 18, under the pressure of the liquid, comes in contact with the conducting element 10 in such a way that the transverse groove 26 is completely sealed off and that no return flow of the liquid is able to reach the transverse groove or the rest of the gas supply conduit 20.

In further illustration of the gassing device according to the invention, FIG. 3 shows a top view onto a part of the conducting element shown in FIG. 1. The membrane 18, with its perforation 28, can be seen in the left section of FIG. 3. This membrane is interrupted in the area of the transverse groove 26. The surface of the conducting element 10 is visible futher to the right. At this point the radial discharge 24 can be distinguished which discharge leads into the axial blind-end bore, as can the transverse groove 26 which extends from the radial discharge to the free end of the conducting element not depicted.

As FIGS. 1 and 3 demonstrate, a fastening connection 16 is attached to the right portion of the conducting element 10. Said fastening connection exhibits a thread 32 which, compared with the surface 30 of the conducting element 10, is reduced in its diameter. The transition from the thread 32 to the surface of the conducting element is configured as a stop face 34. By means of this thread 32 the conducting element 10 can be screwed, effecting a water-proofing seal.

To facilitate assembly, parts of the surface 30 of the conducting element have, in the area between the stop face 34 and the discharge, been configured as a flat face 36. By means of an assembling tool which engages these flat faces 36 the torque required for assembly and disassembly without increasing damage to the membrane 18.

As can be appreciated from the constructional design of the conducting element 10, said part can fabricated in one piece with extrusion or injection mold processes. This is made possible principally because most of the walls extend in an axial direction and only a few wallss project radially. In this regard, the wall thickness can also be limited to that degree required to ensure mechanical stability. In this way material and weight costs can be reduced.

Liquid entering through the open end 12 to reduce buoying forces contributes to the fact that the conducting element 10 can be flooded to such an extent that the space remaining and occupied by the gas in contrast thereto hardly results in any significant buoyancy.

FIG. 4, in conclusion, depicts a gassing device having several conducting elements 10 connected to a central gas supply distributor 38. The gas supply distributor 38 exhibits parallel side walls 40 and 42 into which several opposed bores 44 and 46 have been let. For assembly purposes a sleeve 48 is screwed onto the fastening connection 16 of one of the conducting elements. Bores 44 and 46 in the parallel side walls 40 and 42 of the central gas supply distributors are large enough so that the sleeve 48 can just be fitted through the bores 44 and 46, while the surface 30 of the conducting element 10 has a diameter which is larger than the bores 44 and 46, such that the stop face 34 of the conducting element 10 comes to bear against one of the side walls 40, 42.

From the other side a conducting element 10 is thereupon fitted through the bore 40 together with its fastening connection 16 and screwed into the sleeve 48. In their bolted-together state both conducting elements 10 are connected by the sleeve 48 to their fastening connection 16 and braced against the side walls 40 and 42 of the gas supply distributor 38.

For purposes of assembly or disassembly, the conducting elements 10 can be tightened or screwed on to their flat faces 36 by means of suitably configured assembly tools. Gas is fed to the gas supply conduits 20 in the conducting element 10 by means of a gas intake orifice 50 in the sleeve 48.

What is claimed is:

1. A gas injection device for introducing a gas into a liquid, especially air into sewage, comprising:
    a tubular nozzle having a first end and a second end; said nozzle being open at the first end and being closed at the second end;
    a partition for closing said second end of said nozzle;
    a fastening connection at the second end for securing the nozzle to a supply of gas;
    a membrane having perforations and said membrane placed around the outside of the nozzle;
    a gas-supply channel that opens in the vicinity of the membrane; said gas-supply channel comprising a chamber that is coaxial with the second end of the nozzle and is demarcated by said partition, and said gas-supply channel also comprising a radial outlet that is adjacent to the chamber and extends through the wall of the nozzle;
    said chamber having a bore, one end of which is closed off by the partition; and
    said nozzle and said fastening connection being in one piece.

2. The gas injection device of claim 1, further comprising means defining a transverse groove which extends from the outlet of the gas-supply channel to before the first end of the nozzle.

3. The gas injection device of claim 2, wherein said perforations in the membrane are only outside the vicinity of the transverse groove.

4. The gas injection device of claim 2, further comprising a central gas supply distributor into which the nozzle is screwed.

5. The gas injection device of claim 1, wherein said fastening connection is positioned coaxially with and on the second end of the nozzle;
    an axial blind end bore that is in one piece with the nozzle, and that has an outside thread; said connection forming an extension of the axial blind end bore.

6. The gas injection device of claim 5, wherein the nozzle has an outer surface; said outer surface located between the contact surface of the nozzle and the outlet of the gas supply channel and is in the form of a flat face.

7. The gas injection device of claim 1, wherein the nozzle and fastening connection are made of a highly impact-resistant plastic.

8. The gas injection device of claim 7, wherein the plastic is high-pressure polyethylene (HPPE).

* * * * *